United States Patent

Doemens et al.

[11] Patent Number: 6,028,432
[45] Date of Patent: Feb. 22, 2000

[54] ARRANGEMENT FOR THE ONE-DIMENSIONAL OR MULTI-DIMENSIONAL DETERMINATION OF THE POSITION OF A LOAD SUSPENSION POINT IN HOISTS

[75] Inventors: Guenter Doemens, Holzkirchen; Wolfgang Wichner, Wendelstein, both of Germany

[73] Assignee: Siemens Aktiengesellschaft, Munich, Germany

[21] Appl. No.: 08/906,405

[22] Filed: Aug. 5, 1997

[30] Foreign Application Priority Data

Aug. 5, 1996 [DE] Germany ................. 196 31 623

[51] Int. Cl.[7] .................................................. G01R 27/26
[52] U.S. Cl. ............................ 324/642; 342/124
[58] Field of Search ........................ 324/637, 642, 324/639, 640; 342/124

[56] References Cited

U.S. PATENT DOCUMENTS

| 5,070,537 | 12/1991 | Ohira | 324/535 |
| 5,557,277 | 9/1996 | Tricoles | 324/326 |
| 5,600,253 | 2/1997 | Cohen | 324/644 |
| 5,841,288 | 11/1998 | Meaney | 324/639 |

*Primary Examiner*—Maura Regan
*Attorney, Agent, or Firm*—Hill & Simpson

[57] ABSTRACT

The stopping of a load suspended from a crane requires a swing control or, respectively, a swing damping. Upon employment of microwave measuring units, spacings between a carrying cable suspension and a load suspension point are determined on the basis of transit time measurements. The position of the load suspension point can be determined from the transit time measurements quickly and with high precision. Swinging motions are avoided by controlled opposing control of the carrying cable suspension.

18 Claims, 2 Drawing Sheets

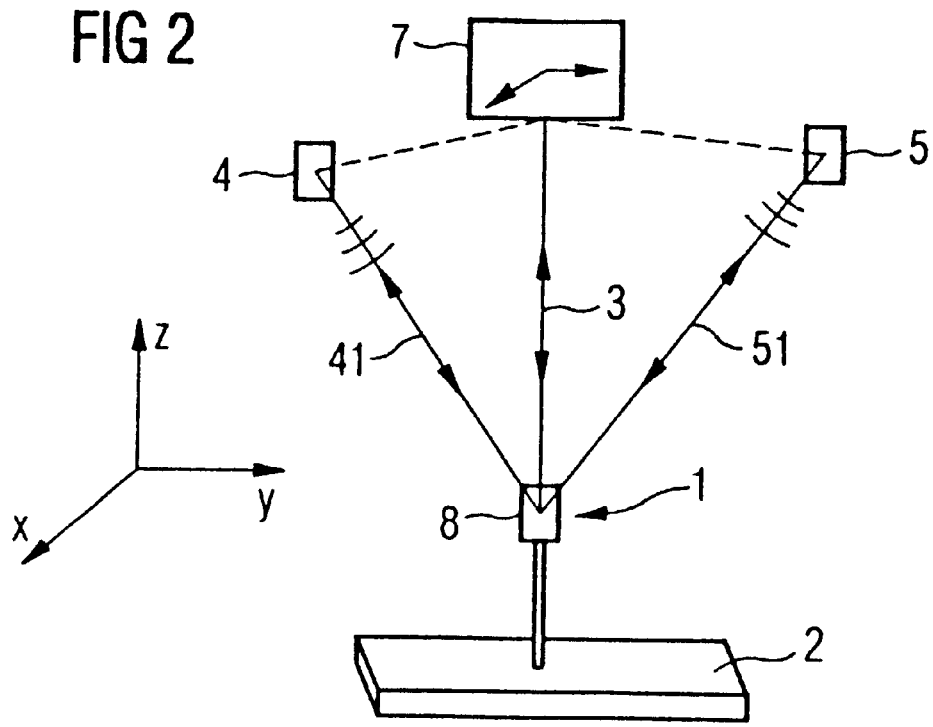
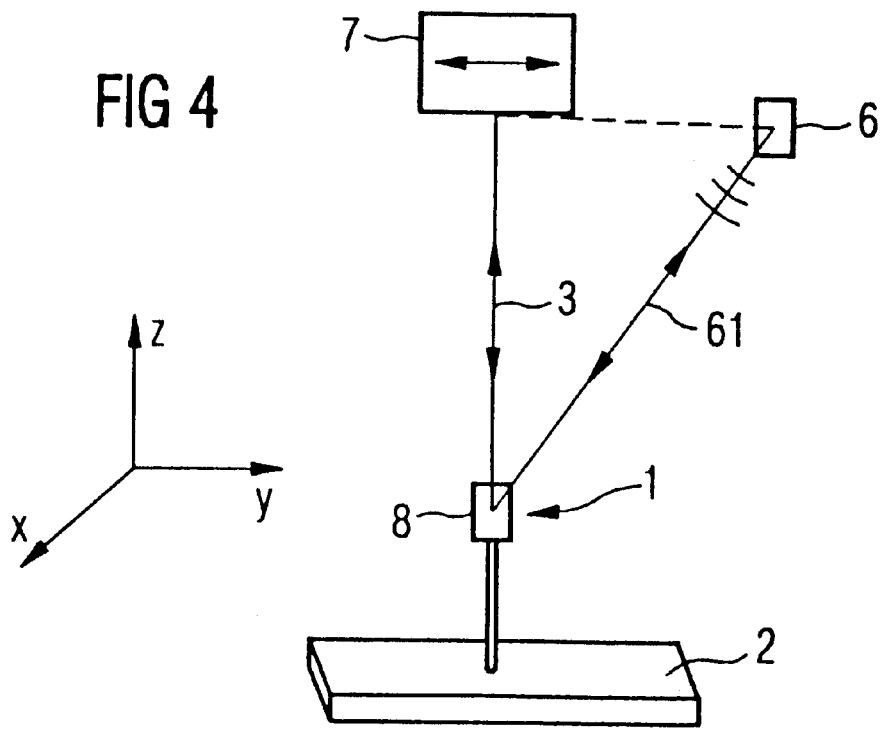

ARRANGEMENT FOR THE ONE-DIMENSIONAL OR MULTI-DIMENSIONAL DETERMINATION OF THE POSITION OF A LOAD SUSPENSION POINT IN HOISTS

BACKGROUND OF THE INVENTION

1. Field of the Invention

The invention is directed to the determination of the position of loads suspended from a carrying cable in hoists that are one-dimensionally or multi-dimensionally moved by corresponding actuating drives.

The stopping of a crane or of the load suspended from the crane over a set-down point normally causes an overshooting or swinging of the load. The time delay for the set-down event resulting therefrom leads to a considerable lengthening of the overall transport time of the load. Rocking or, respectively, swinging of the load, however, can be entirely or partially stabilized by movements of the crab or, respectively, of the crane or of the actuating drives executed correspondingly anti-phase. The constant position measurement of the load suspension means is necessary therefor, whereby a defined point, the load suspension point, is expediently considered. In the general case, the lateral position in the x-direction and y-direction of the coordinate system must be identified with a precision of below ±1 cm proceeding from the crab plane. The measuring time connected therewith should not exceed a few milliseconds. Such measurements are usually implemented in non-contact fashion and leads to a position determination in space. These measurements, however, are disrupted by certain environmental conditions such as temperature, rain, snow, darkness or bright sunlight and the like.

Currently known methods for an average position action of the above type are implemented either by an opto-electronic acquisition of the load suspension point or via a swing angle measurement with mechanical or magnetic measuring means in the proximity of the cable suspension during operation of the crab. Given the latter method, however, cable undulations can considerably falsify the measured result. In the first-cited, opto-electronic method, the acquisition of the load suspension point is negatively influenced by the environmental conditions. Thus, the dependability of these methods is not always assured. Over and above this a two-dimensional position determination within a few milliseconds presents difficulties. Although optical reflectors or infrared light sources have been applied in the meantime for better recognition of the load suspension means for the opto-electronic method, these devices cannot eliminate the disadvantages of said method.

SUMMARY OF THE INVENTION

The invention is based on the object of making an arrangement available for the determination of the position of a load carried by cable of a hoist. The position determination should function constantly and disruption-free and be the basis for a damping of swing.

In an embodiment, microwave range-finding is utilized and various instances of problem-solving are described on the basis of said object.

The invention is based on the perception that significant advantages can be achieved with the utilization of microwave range-finding technology for a position determination of the load in hoists. The particular advantage is thereby comprised in the propagation of the microwaves that is undisturbed by the environmental conditions. Over and above this, a high precision can be achieved in the range-finding, and the measuring times are extremely short. Microwave range-finding is based on measurements of the transit time of the signals that are sent out and in turn received. The frequency range lies between 1 and 100 GHz. A microwave transmitter transmits a spherical wave that is received by a corresponding receiver. When a microwave signal is deflected via what is referred to as a retro-reflector, then this in turn reflects a spherical wave.

Proceeding from a lateral carrying cable suspension, i.e. a carrying cable suspension movable in x-direction and y-direction, a swing will always occur upon arrest when moving a load suspended at the carrying cable. The inventive arrangement provides that microwave measuring units are attached with which the distance measurements between carrying cable suspension and load suspension point can be implemented, whereby the approximate measuring directions describe a finite angle with the carrying cable. These microwave measuring units are arranged, on the one hand, with a known position relative to the carrying cable suspension and, on the other hand, with a known position relative to the load suspension point. For a position measurement of the load suspension point, it is important to optimally design the angle between the carrying cable and the measuring directions corresponding to the microwave measuring units. Dependent on the respective application, the microwave measuring units are arranged at approximately equal intervals around the carrying cable.

According to the invention, the microwave measuring technology is advantageously utilized at hoists, whereby the position determination ensues one-dimensionally, two-dimensionally or three-dimensionally dependent on the respective application or use. Correspondingly, the equipment of the inventive arrangement exhibits a different plurality of microwave measuring units.

The position of the load suspension point can be three-dimensionally determined by employing at least three microwave measuring units. In this system, respectively three ranges are determined on the basis of transit time measurements. The position of the load suspension point is then calculated from the intersection of the three spherical surfaces with the radii that correspond to the distance between transmitter and receiver or, respectively, transmitter/receiver combination and retro-reflector, and the centers that are respectively represented by the positions of the transmitters or, respectively, transmission and reception combinations. Since a damping of the swing of the load suspension point for essentially lateral movements comes into consideration for standard hoists, there is the possibility of obtaining the acquisition of the z-direction, i.e. of the height coordinate, by a measurement of the length of the carrying cable as a substitute for one microwave measuring unit. In this case, two microwave measuring units would be employed in addition to the measurement of the cable length. The height of the load suspension point, however, is more reliably determined by employing three microwave measuring units than it is by measuring the cable length.

When the load suspension point can only move one-dimensionally back and forth, the position measurement of the load suspension point initially requires two microwave measuring units. To this end, it is necessary that the connecting line between the two transmission or, respectively, transmission and reception units lies in the swinging direction of the load suspension point. The connecting line should at least be parallel to the swinging direction. A load suspension point two-dimensionally movable in a vertically residing plane can be measured with this embodiment.

A likewise two-dimensional position measurement for the load suspension point derives when the position of the load suspension point is determined with a microwave measuring unit lying in the plane of motion of the load suspension point and the measurement of the cable length. Since the height value is of no direct significance again for practical swing damping, the determination thereof can be accomplished be measuring the length of the carrying cable. Since the excursion of a carrying cable can be set at a maximum of 6°, the swing damping is implemented quasi-linearly. Knowledge of the height value (z-coordinate), however, can be employed for the exact set-down of the load.

Other objects and advantages will be apparent to those skilled in the art upon review of the figures, the detailed description of the preferred embodiments and the appended claims.

BRIEF DESCRIPTION OF THE FIGURES

Exemplary embodiments are described below with schematic Figures.

FIG. 2 illustrates an inventive microwave measurement arrangement with two microwave measuring units, whereby a three-dimensional determination of the load suspension point can be achieved by an additional cable length measurement;

FIG. 4 illustrates an arrangement corresponding to FIG. 3, whereby one microwave measuring unit is replaced by the cable length measurement.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
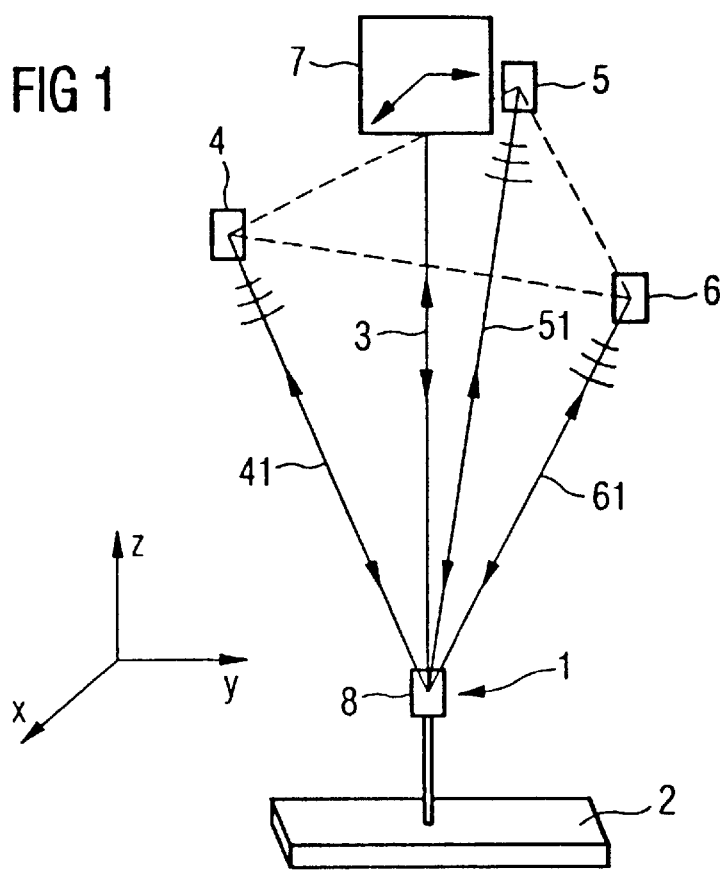
FIG. 1 illustrates an inventive microwave measurement arrangement for the three-dimensional determination of the load suspension point.

FIG. 1 illustrates a carrying cable suspension 7 with a carrying cable 3 and a load attack point 1. The carrying cable suspension 7 is two-dimensionally movable in planar x/y-directions. A height movability of the load 2 is established by winding up and unwinding the carrying cable is the carrying cable suspension 7. The transmitter/receiver combinations 4, 5, 6 laterally spaced from the carrying cable suspension 7 respectively beam a microwave signal that is fashioned as a spherical wave in the direction toward the retro-reflector or retro-reflectors 8. This microwave signal is respectively reflected at a reflective component hereinafter referred to as the retro-reflector 8 and received at the respective transmitter/receiver combination 4, 5, 6. This forms the basis for the transit time measurement and distance determination for the distances 41, 51, 61. As a result of their position per microwave measuring unit, the combinations 4, 5, 6 and the corresponding retro-reflectors respectively determine the direction in which the distance should be measured. The position of the load suspension point is determined with the described evaluation via intersecting spherical surfaces whose center is respectively represented by the combinations 4, 5, 6, and, following thereupon, an antiphase movement for the carrying cable suspension 7 is targeted, so that a swing damping of the swinging load suspension point 1 ensues. The measurement can ensue in the millisecond range with a precision of ±1 cm, as a result whereof a constant position determination is possible.

Correspondingly, the swing damping can be iteratively or successively continued up to the standstill of the load suspension point 1 or, respectively, of the load 2, or a control implemented in time prevents a swinging from the very outset. When, according to FIG. 1, three microwave measuring units 4–8, 5–8, 6–8 are employed, then the height coordinate z can be determined in addition to the two-dimensional swing damping. Otherwise, this is relatively imprecisely determined via measurement of the cable length. A uniform fashioning of the retro-reflectors 8 can, for example, cover all three microwave measuring units at the same time. Different frequencies can be utilized for differentiating between the different measuring units.

In FIG. 2, the carrying cable suspension 7 is likewise two-dimensionally movable in planar directions. The load suspension point 1 can be three-dimensionally determined. Analogous to FIG. 1, the transmitter/receiver combinations 4, 5 are fashioned to measuring units with the retro-reflector 8, whereby they do not lie on a straight line that proceeds through the carrying cable suspension 7 at the same time. The length of the carrying cable 3 is mechanically measured. With an arrangement according to FIG. 2, thus, a three-dimensional position determination and at least a two-dimensional swing damping acting in planar directions are likewise possible and a height determination of the load suspension point 1 can be achieved.

By contrast to FIGS. 1 and 2, FIGS. 3 and 4 exhibit significant limitations with respect to the degrees of freedom. The carrying cable suspension 7 can only be moved one-dimensionally along the y-axis. Correspondingly, the load suspension point 1 with the load 2 can swing only in a perpendicularly residing plane. This swinging can be damped by corresponding anti-phase drive control in the carrying cable suspension 7, whereby the constant determination of the position of the load suspension point 1 again occurs partly or completely with the microwave measurement technology.

Figure 3:
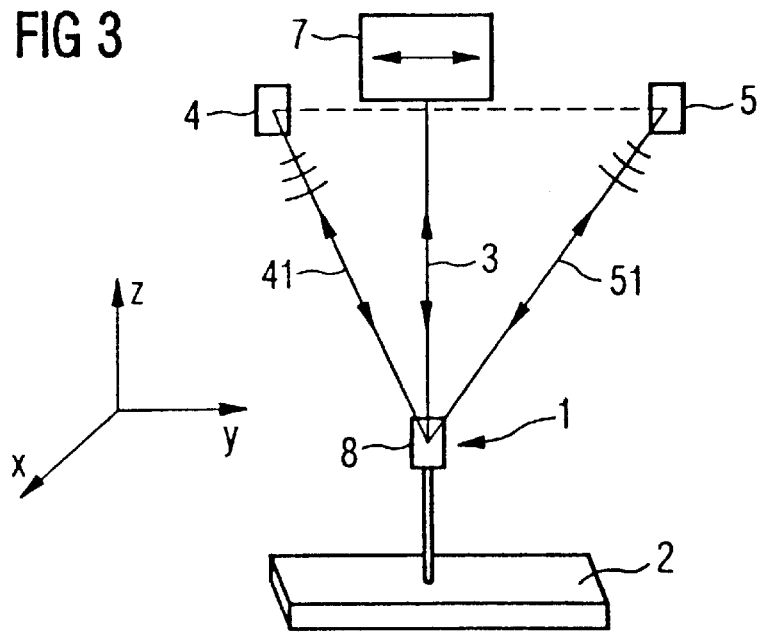
FIG. 3 illustrates an inventive microwave measurement arrangement for two-dimensional position determination of the load suspension point upon utilization of two microwave measuring units.

Two microwave measuring units are used in FIG. 3, the units 4–8 and 5–8. The transmitter/receiver combinations 4, 5 according to FIG. 3 lie at opposite sides of the carrying cable 3 and in the swing plane in the plane of motion of the load suspension point 1 or, in other words, on a straight line through the carrying cable suspension 7. A one-dimensional swing of the load suspension point 3 can be identified and compensated with the arrangement according to FIG. 3. In an even more simplified case, one microwave measuring unit can be replaced via the measurement of the cable length, so that only a single microwave measuring unit is present according to FIG. 4. In FIG. 4, the transmitter/receiver combination 6 must likewise lie in the swinging plane of the load suspension point 1.

The different embodiments of the invention shown in FIGS. 1 through 4 optionally yield a high measuring precision when measurement is undertaken entirely via microwave measuring units. When the cable length measurement at the carrying cable 3 is used, this being equivalent to a mechanical measurement, sacrifices with respect to the precision are to be anticipated. A typical frequency for a microwave measuring unit is, for example, 24 GHz and a clock time for the measurements lies at, for example, 10 ms.

A reference mark outside of the crane region can be exploited, for example, upon simultaneous or partially alternative employment of central locating systems. An optimum matching can thus be undertaken taking the time and the technical-qualitative possibilities, i.e. the measuring precisions, of different locating systems into consideration.

When, for example, a hall-bound locating system is employed, then it is conceivable to centrally determine the position of the carrying cable suspension (7), separately from the likewise central determination of the position of the load suspension point (1). The central locating system can thereby be adapted in an arbitrary form to the internal locating system of the crane. In addition to the measuring precision, the time availability together with the speed of the signal evaluation is an essential criterion for a job division between the internal locating or, respectively, positioning system of the crane and the central locating or, respectively, positioning system. Thus, for example, a current GPS system involves a precision of only a few meters and the relatively high number of available satellites can nonetheless not guarantee constant availability.

Since a precision in the decimeter range is certainly desired for an embodiment of the invention, an employment of locating systems installed in a hall is realistic. The range differences between measuring instrument and measured subject are thereby not as great as in satellite-supported systems, and the measuring precision is adequately good given a position measurement from a building wall to a crane or, respectively, to its load. Given a further enhancement of precision in GPS systems, however, their use is also meaningful.

Although only four embodiments of the present invention have been illustrated and described, it will at once be apparent to those skilled in the art that variations may be made within the spirit and scope of the present invention. Accordingly, it is intended that the scope of the present invention be limited solely by the scope of the hereafter appended claims and not any wording in the foregoing description.

What is claimed:

1. An apparatus for a three-dimensional determination of the position of a load suspension point of a hoist from which a load is suspended from a carrying cable, the load being movable in an x-direction, y-direction and z-direction, the apparatus comprising:
   at least three microwave measuring units, each microwave measuring unit comprising a microwave transmitter and a corresponding microwave receiver, both the transmitter and receiver for measuring a mutual spacing between each transmitter and its respective receiver from a reflective component by microwave range-finding,
   each microwave measuring unit being arranged at known positions relative to the hoist, the reflective component being arranged at a known position relative to the load suspension point,
   the apparatus further comprising a plurality of actuators for moving the load in the x-direction and in the y-direction.

2. The apparatus of claim 1 wherein the microwave measuring units are approximately uniformly distributed around the carrying cable at a known angle with respect to the carrying cable.

3. The apparatus of claim 1 wherein the reflective component is disposed adjacent to the load suspension point.

4. The apparatus of claim 1 wherein the transmitter and the receiver of each microwave measuring unit are disposed adjacent to one another.

5. The apparatus of claim 1 wherein the transmitter and the receiver of each microwave measuring unit are disposed adjacent to one another,
   wherein each microwave measuring unit is spaced laterally outward from the hoist, and
   wherein the reflective component is disposed adjacent to the load suspension point.

6. The apparatus of claim 1 wherein each of the microwave measuring units operate at different frequencies.

7. The apparatus of claim 1 further comprising a central locating system for determining the position of the hoist with respect to a fixed reference point.

8. The apparatus of claim 7 wherein the central locating system is a global positioning system (GPS).

9. The apparatus of claim 1 further comprising a central locating system for determining the position of the load suspension point with respect to a fixed reference point.

10. The apparatus of claim 9 wherein the central locating system is a global positioning system (GPS).

11. An apparatus for a three-dimensional determination of a position of a load suspension point of a hoist from which a load suspended from a carrying cable having an adjustable length, the load being moveable in the x-, y- and z-directions, the apparatus comprising:
    at least two microwave measuring units, each microwave measuring unit comprising a microwave transmitter and a corresponding microwave receiver, each transmitter and its corresponding receiver for measuring a mutual spacing from a reflective component by microwave range-finding in combination with the means for measuring the length of the carrying cable,
    the two microwave measuring units being disposed at known positions relative to the hoist, and the reflective component being disposed at a known position relative to the load suspension point,
    the apparatus further comprising at least one actuator for moving the load along at least one of the x-direction and the y-direction.

12. The apparatus of claim 11 wherein the microwave measuring units are not arranged at opposite sides of the carrying cable, and approximate alignments of the microwave measuring units define an angle with the carrying cable.

13. The apparatus of claim 11 wherein the reflective component is disposed adjacent to the load suspension point.

14. The apparatus of claim 11 wherein the transmitter and the receiver of each microwave measuring unit are disposed adjacent to one another.

15. The apparatus of claim 11 wherein the transmitter and the receiver of each microwave measuring unit are disposed adjacent to one another,
    wherein each microwave measuring unit is spaced laterally outward from the hoist, and
    wherein the reflective component is disposed adjacent to the load suspension point.

16. The apparatus of claim 11 wherein each of the microwave measuring units operate at different frequencies.

17. An apparatus for a determination of the position of a load suspension point of a hoist from which a load is suspended from a carrying cable, the load being movable in a z-direction as well as at least one of an x-direction and a y-direction, the apparatus comprising:

at least one microwave measuring unit, said microwave measuring unit comprising a microwave transmitter and a corresponding microwave receiver, both the transmitter and receiver for measuring a mutual spacing between each transmitter and its respective receiver from a reflective component by microwave range-finding, the at least one microwave measuring unit being arranged at a known position relative to the hoist, the reflective component being arranged at a known position relative to the load suspension point, the apparatus further comprising at least one actuator for moving the load along at least one of the x- and y-directions.

18. An apparatus for a three-dimensional determination of the position of a load suspension point of a hoist from which a load is suspended from a carrying cable, the load being movable in an x-direction, y-direction and z-direction, the apparatus comprising:

at least three microwave measuring units, each microwave measuring unit comprising a microwave transmitter and a corresponding microwave receiver, both the transmitter and receiver for measuring a mutual spacing between each transmitter and its respective receiver from a reflective component by microwave range-finding, each microwave measuring unit being arranged at known positions relative to the hoist, the reflective component being arranged at a known position relative to the load suspension point, wherein the microwave measuring units are approximately uniformly distributed around the carrying cable at a known angle with respect to the carrying cable.

* * * * *